(12) United States Patent
Junca

(10) Patent No.: US 7,798,469 B2
(45) Date of Patent: Sep. 21, 2010

(54) APPARATUS AND METHOD FOR LIFTING AND ALIGNING TOILETS

(76) Inventor: Charles H. Junca, 151 Fernhill Ave., Lafayette, LA (US) 70506

( * ) Notice: Subject to any disclaimer, the term of this patent is extended or adjusted under 35 U.S.C. 154(b) by 1161 days.

(21) Appl. No.: 11/436,374

(22) Filed: May 18, 2006

(65) Prior Publication Data

US 2007/0266492 A1 Nov. 22, 2007

(51) Int. Cl.
*B60P 1/48* (2006.01)
(52) U.S. Cl. .............................. 254/9 B; 254/2 B; 4/661
(58) Field of Classification Search .............. 254/9 B, 254/6 B, 4 B, 10 B, 8 B, 2 B, 7 R; 4/661
See application file for complete search history.

(56) References Cited

U.S. PATENT DOCUMENTS

| | | | |
|---|---|---|---|
| 3,262,590 A | 7/1966 | Lynn | |
| 3,391,905 A | 7/1968 | Burnes | |
| 4,722,511 A | 2/1988 | Chitwood | |
| 5,203,065 A | 4/1993 | Peters | |
| 5,373,593 A | 12/1994 | Decky et al. | |
| 5,505,430 A | 4/1996 | Barnett | |
| 5,556,076 A | 9/1996 | Jacquay | |
| 5,897,101 A * | 4/1999 | Snyder ..................... 254/8 B |
| 6,015,137 A | 1/2000 | Guevara et al. | |
| 6,135,466 A * | 10/2000 | Irwin ..................... 280/47.28 |
| 6,416,039 B1 * | 7/2002 | Pietrusynski .............. 254/8 B |
| 6,685,170 B1 | 2/2004 | Gwynn | |
| 6,752,379 B1 * | 6/2004 | Wall ........................... 254/7 R |
| 6,886,192 B1 * | 5/2005 | Merrill ........................ 4/661 |
| 6,966,542 B2 * | 11/2005 | Bettencourt ............... 254/131 |
| 7,137,615 B2 * | 11/2006 | Ray et al. ................. 254/10 B |
| 7,303,181 B1 * | 12/2007 | Nymann .................... 254/8 R |
| 2007/0266492 A1 * | 11/2007 | Junca ........................... 4/661 |

* cited by examiner

*Primary Examiner*—Lee D Wilson
(74) *Attorney, Agent, or Firm*—Jones Walker

(57) ABSTRACT

An apparatus and method for lifting, moving, aligning and lowering a toilet. The apparatus comprises a base frame having three sides, and a lift frame pivotally attached at a first end to the base frame. The apparatus further comprises a jack device, operatively attached to the lift frame, for selectively lifting and lowering the lift frame, and an arm pivotally attached to the lift frame. In one preferred embodiment, the jack device includes a jack cylinder, a piston concentrically disposed within the jack cylinder, and a U-shaped member. In the most preferred embodiment, the U-shaped member is attached at a first point to the piston, and wherein the U-shaped member is pivotally attached to the lift frame at a second point, so that as the piston extends from the jack cylinder, the lift frame is moved. A total of three (3) pivot point sets are included in the most preferred embodiment. Left and right side alignment tubes may also be included.

12 Claims, 5 Drawing Sheets

APPARATUS AND METHOD FOR LIFTING AND ALIGNING TOILETS

CROSS-REFERENCED TO RELATED APPLICATIONS

Not applicable.

BACKGROUND OF THE INVENTION

This invention relates to a lifting apparatus. More specifically, but without limitation, this invention relates to an apparatus and method for lifting, moving, aligning, and lowering toilets.

In the course of remodeling homes, apartments, and businesses, contractors and all maintenance personnel, find it necessary to remove toilets. As those of ordinary skill in the art will appreciate, a toilet outlet line drains to a sewer line. Generally, a seal, such as a wax seal, seals the toilet outlet line relative to the sewer line. Whenever it is necessary to perform work on a toilet, such as to replace the wax seal, a contractor will have to remove the toilet from the toilet foundation (also referred to as the closet bolt flange). Toilets are heavy, bulky and generally awkward to lift, carry, align and lower. Additionally, it is highly undesirable to spill the contents of the bowl. Toilets are also unsanitary, undesirable to touch and lift with arms and hands.

Therefore, it is necessary to have an apparatus to lift the toilet and move the toilet so that the necessary work can be accomplished. Prior art devices have been devised that lift and move the toilet away from the toilet foundation. However, all the prior art devices suffer from several deficiencies. For instance, prior art lifting devices are bulky and cumbersome. Additionally, prior art devices make lowering the toilet back onto the toilet foundation very difficult. No existing art has alignment capability for first time, every time alignment. Also, prior art devices are troublesome to transport from one location to the next.

Hence, there is a need for an apparatus and method for lifting, moving and aligning toilets that is efficient, fast, sanitary and dependable, without aggravation and human injury. There is also a need for a lowering device that can align the toilet base flange with the toilet foundation so that the toilet can be accurately placed back on its foundation. There is also a need for an apparatus that allows for lifting and alignment in a single device. These and many other needs will be met by the apparatus and method described below.

SUMMARY OF THE INVENTION

An apparatus for lifting a toilet is disclosed. The apparatus comprises a base frame having a first side, a second side and a third side, and a lift frame pivotally attached at a first end to the base frame. The apparatus further comprises a jack means, operatively attached to the lift frame, for selectively lifting and lowering the lift frame, and an arm pivotally attached to the lift frame. In one preferred embodiment, the jack means comprises a jack cylinder, a piston concentrically disposed within the jack cylinder, and a U-shaped member. In the most preferred embodiment, the U-shaped member is attached at a first point to the piston, and wherein the U-shaped member is pivotally attached to the lift frame at a second point, so that as the piston extends from the jack cylinder, the lift frame is moved in a balance left and right plane.

In one preferred embodiment, the arm contains a first rod and a second rod, and wherein the apparatus further comprises a first railing attaching the first rod with the second rod in order to keep the first rod and the second rod together during lifting. Additionally, the lift frame may contain a first member and a second member, and wherein the apparatus further includes a second railing attaching the first rod with the second rod in order to keep the first rod and the second rod together (equal left, right action) during lifting.

The base frame, in the preferred embodiment, contains wheel means, mounted on an underside of the base frame, for transporting the base frame. In the most preferred embodiment, the apparatus further comprises means for aligning the base frame and the toilet base flange relative to a plurality of bolts contained on a toilet foundation. The aligning means may comprise a first tube attached to the first side of the base frame and a second tube attached to the second side of the base frame. The alignment tubes are generally configured to fit through the openings in the flange and onto the bolts in the toilet foundation.

A method for lifting a toilet is also disclosed. In this embodiment, the toilet contains a front portion and a rear portion, and wherein the toilet contains a flange having a plurality of openings therein, and wherein the flange is operatively connected to a toilet foundation. The method comprises providing a jacking apparatus, and wherein the jacking apparatus includes: a base frame having a first side, a second side and a third side; a lift frame pivotally attached at a first end to the base frame; a jack cylinder; a piston concentrically disposed within the jack cylinder; a U-shaped member, with the U-shaped member attached at a first point to the piston, and wherein the U-shaped member is pivotally attached to the lift frame at a second point, so that as the piston extends the lift frame is moved; and an arm pivotally attached to the lift frame.

The method further comprises positioning the first side and the third side about the front portion of the toilet, extending the piston from the jack cylinder, and raising the U-shaped member. The method further includes pivoting the U-shaped member relative to the lift frame, lifting the lift frame relative to the base frame via the piston from the jack cylinder and engaging the lift frame about the toilet. Next, the toilet can be lifted from the toilet foundation.

The method includes placing a tubular member through openings in the toilet base flange and placing the tubular member onto a bolt operatively attached to the toilet foundation. It should be noted that in one embodiment both left and right tubular members may be provided. The method includes lowering the piston and lowering the U-shaped member, which in turn pivots the U-shaped member relative to the lift frame. Next, the toilet is lowered onto the toilet foundation, with toilet bolts aligned and exposed for the bolts lock nuts, securing the toilet to the toilet base flange.

In one preferred embodiment, the step of positioning the first side and the third side about the front portion of the toilet includes securing a first railing about the front portion of the toilet, and wherein the first railing is attached to the arm, and the method further comprises preventing the toilet from moving forward due to the first railing. Additionally, the step of positioning the first side and the third side about the front portion of the toilet includes securing a second railing about the rear portion of the toilet, and wherein the second railing is attached to the arm, and the method further comprises preventing the toilet from moving backwards due to the second railing. In one preferred embodiment, the jack apparatus includes a hydraulic cylinder and wherein the step of lifting the lift frame includes pumping a hydraulic fluid into the hydraulic cylinder. Additionally, the step of lowering the lift frame includes releasing the hydraulic fluid from the hydraulic cylinder.

An advantage of the present invention is that the apparatus can be folded. Another advantage is that the apparatus is movable. Yet another advantage is the pivoting nature of the apparatus gives the operator a mechanical advantage in lifting, aligning and lowering. Another advantage is the cantilever design of the arms relative to the base frame. Still yet another advantage is the prevention of the spilling of the contents of bowl during lifting and lowering.

A feature of the present invention includes the three pivot points provided by the apparatus. Another feature is the jacking device can be hydraulic or pneumatic. Another feature is the first railing keeps toilet from a forward movement. Yet another feature is the second railing keeps the toilet from a backward movement. Another feature is that the apparatus keeps the bowl balanced and level during lifting and lowering. Another feature are the attached alignment tubes and the slow, easy, lowering, aligning movement which does not damage the wax seal.

Still yet another feature is the connection of the first and second railing keeps the lifting frame held together during lifting, aligning and lowering of the toilet. Another feature is the U-shaped rod, which is operatively attached to the jack means, and wherein the U-shaped rod allows for raising and lowering the lifting frame. Yet another feature is that the U-shaped rod lifts the first and second arms of the lifting frame equally, and thus, distributes the load equally and evenly between the first and second arms of the lifting frame.

DETAILED DESCRIPTION OF THE PREFERRED EMBODIMENTS

Figure 1:
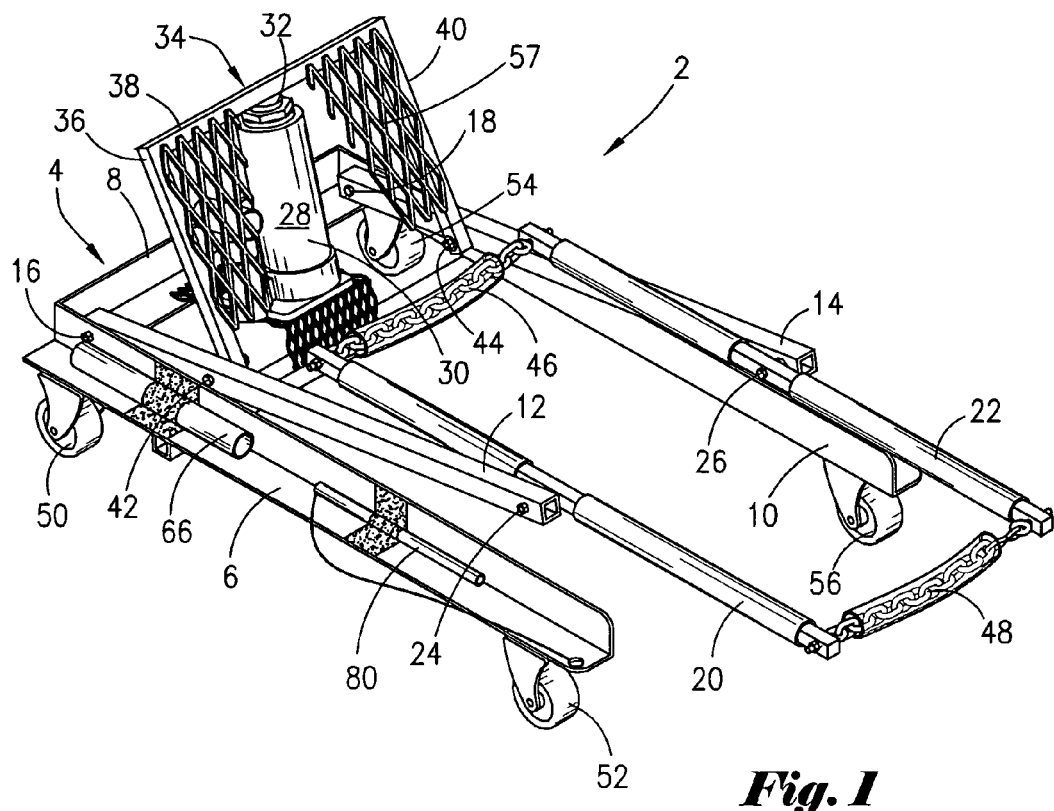
FIG. 1 is a perspective front view of the most preferred embodiment of the apparatus.

Referring now to FIG. 1, a perspective front view of the most preferred embodiment of the apparatus 2 will now be described. The apparatus includes the base frame 4 that contains a first side 6, second side 8, and third side 10. The apparatus further includes the lift frame which includes the first member 12 and the second member 14. The first member 12 is pivotally attached to the side 6 at point 16; the second member 14 is pivotally attached to the side 10 at point 18. An arm is pivotally attached to the lift frame; more specifically, the arm contains the first rod 20 and the second rod 22. The rod 20 is pivotally connected to member 12 at point 24. The rod 22 is pivotally connected to member 14 at point 26.

FIG. 1 further depicts the jack means, seen generally at 28, for selectively lifting and lowering the lift frame. The jack means comprises a jack cylinder 30, a piston 32 and a U-shaped member 34. As seen in FIG. 1, the U-shaped member 34 is attached to the piston 32, and wherein the U-shaped member has side 36, side 38, and side 40, and wherein the side 36 is pivotally connected to the first member 12 at point 42 and the side 40 is pivotally connected to the second member 14 at point 44. In this way, when the piston 32 is extended from the jack cylinder 30, the U-shaped member 34 moves upward which in turn causes the first member 12 and second member 14 to move upward in an equal and equivalent manner so that the forces are equally distributed about the apparatus 2.

The apparatus 2 further contains the first railing 46 which attaches the first rod 20 to the second rod 22 in order to keep the first rod 20 and the second rod 22 together during lifting and lowering. FIG. 1 also shows the second railing 48 which attached the first rod 20 to the second rod 22 in order to keep the rods 20, 22 together during lifting and lower. In the most preferred embodiment, the railings are a chain connected to the rods 20, 22, and wherein a protective material layer, such as plastic, may be added about the chain. The first and second railings also function to capture the toilet and keeps the toilet from moving backward and forward during lifting and lowering.

FIG. 1 further depicts wheel means mounted on the underside of the base frame 4 for transporting the apparatus 2. More specifically, the wheels 50, 52 are mounted to the underside of side 6, and the wheels 54, 56 are mounted to the underside of side 10. A metal grading 57 is shown to structurally strengthen the U-shaped member 34.

Figure 2:
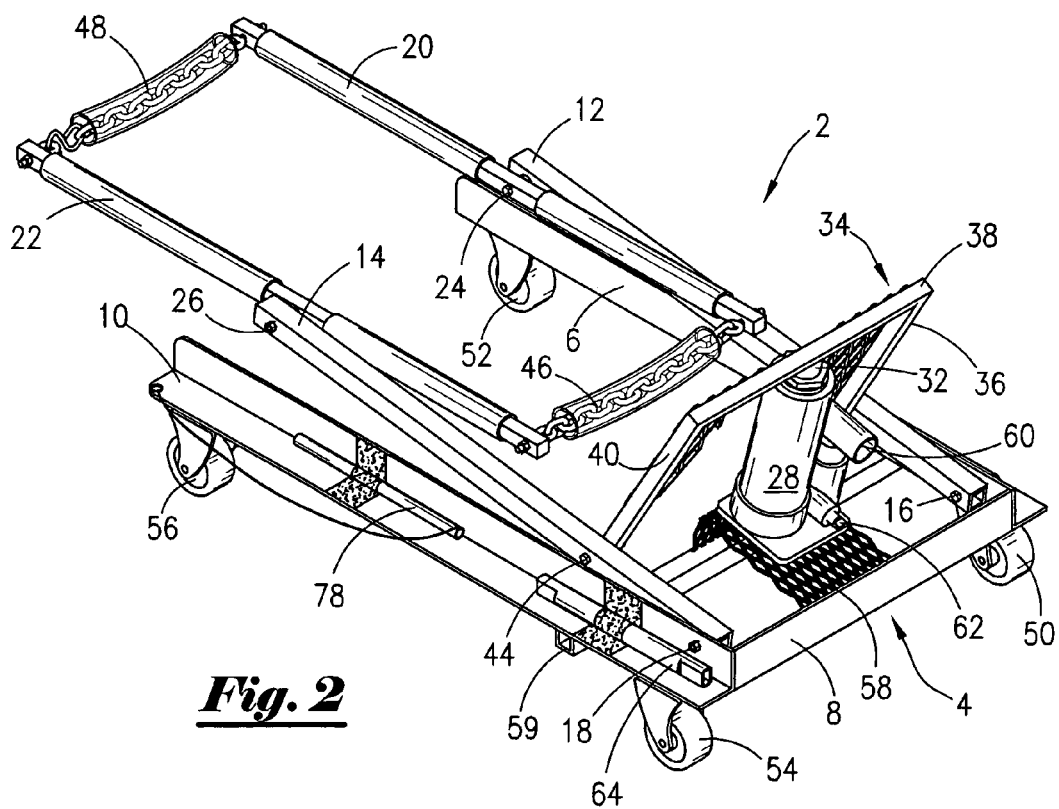
FIG. 2 is a perspective rear view of the apparatus illustrated in FIG. 1.

Referring now to FIG. 2, a perspective rear view of the apparatus 2 illustrated in FIG. 1 will now be described. It should be noted that like numbers appearing in the various figures refer to like components. Thus, FIG. 2 depicts the jack cylinder 30 mounted to a metal grading 58, and wherein the metal grading 58 is connected to a cross-member 59 and wherein the cross-member 59 is connected to sides 6 and 10 of the base frame 4. The side 40 is shown pivotally connected to the second member 14 at point 44. Hence, as the piston 32 extends, the first member 12 and the second member 14 will raise. As the piston 32 lowers, the first member 12 and the second member 14 will lower.

FIG. 2 shows the controls for the hydraulic cylinder 30, and more particularly, pumping lever inlet 60 and the release control valve 62. The pumping lever allows the operator to pump the hydraulic cylinder 30 to extend the piston 32. The release control valve 62 allows the operator to unscrew the valve in order to release pressure so that the piston lowers. The jack means is commercially available from Larin Corporation under the name Two Ton Capacity Hydraulic Jack. The wheels 50, 52, 54, 56 are depicted, as well as the first member 12 and the second member 14.

Figure 3:
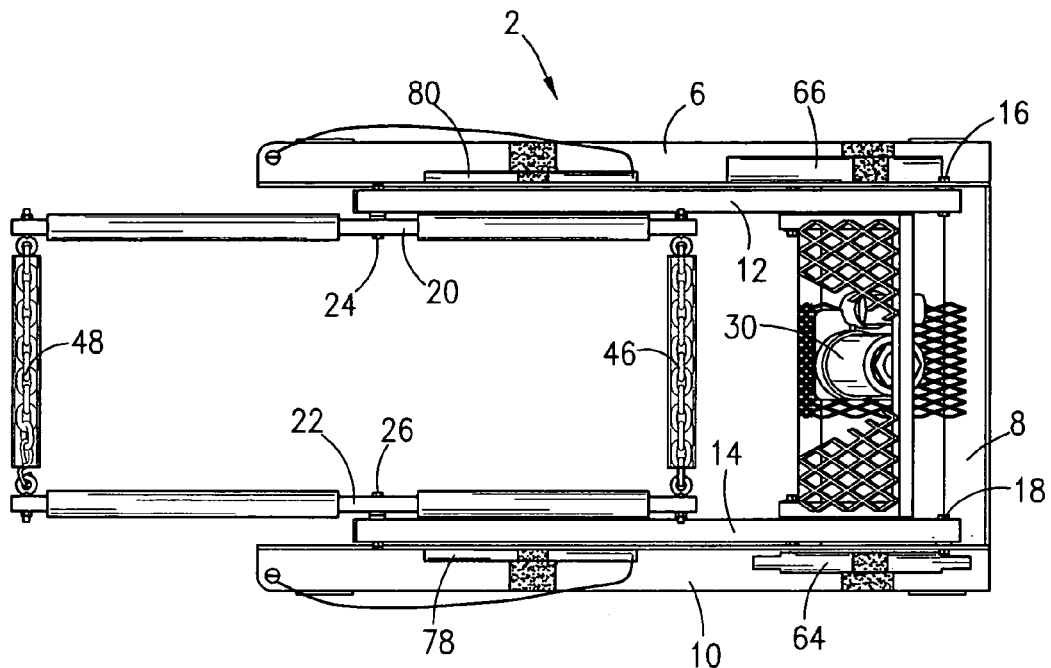
FIG. 3 is a top view of the apparatus seen in FIG. 1.

Referring now to FIG. 3, a top view of the apparatus 2 seen in FIG. 1 will now be described. FIG. 3 depicts the first side 6, second side 8 and the third side 10. The first member 12 and the second member 14 is shown, as well as the first rod 20 and the second rod 22. The first railing 46 adjacent the jack cylinder 30 is shown along with the second railing 48. The pivot points 24 and 26 for pivoting rods 20, 22 are shown, as well as pivot points 16, 18 for pivoting the members 12, 14 relative to the side 6 and side 10.

Figure 4:
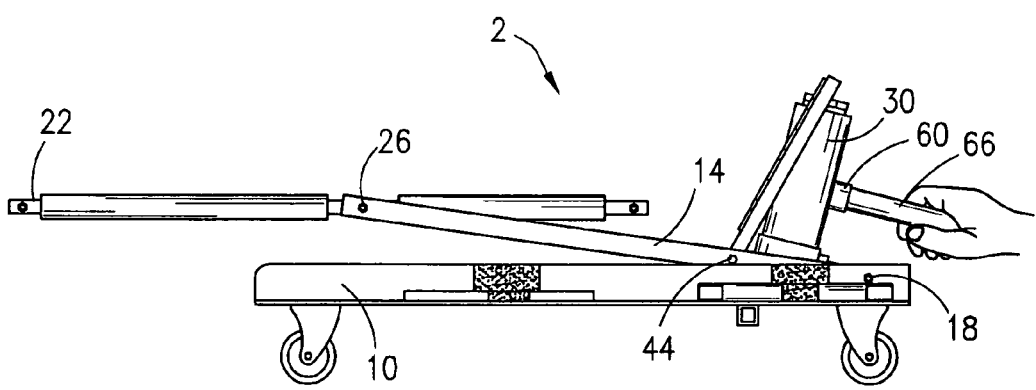
FIG. 4 is a side view of the apparatus of FIG. 1 in the lowered position.

FIG. 4, which is a side view of the apparatus 2 in the lowered position (which may also be referred to as the folded position), will now be described. Hence, the rod 22 is shown lowered relative to the side 10. FIG. 4 also depicts the jack cylinder 30 along with the pumping lever inlet 60, and wherein the lever 66 is installed within the inlet 60.

Figure 5:
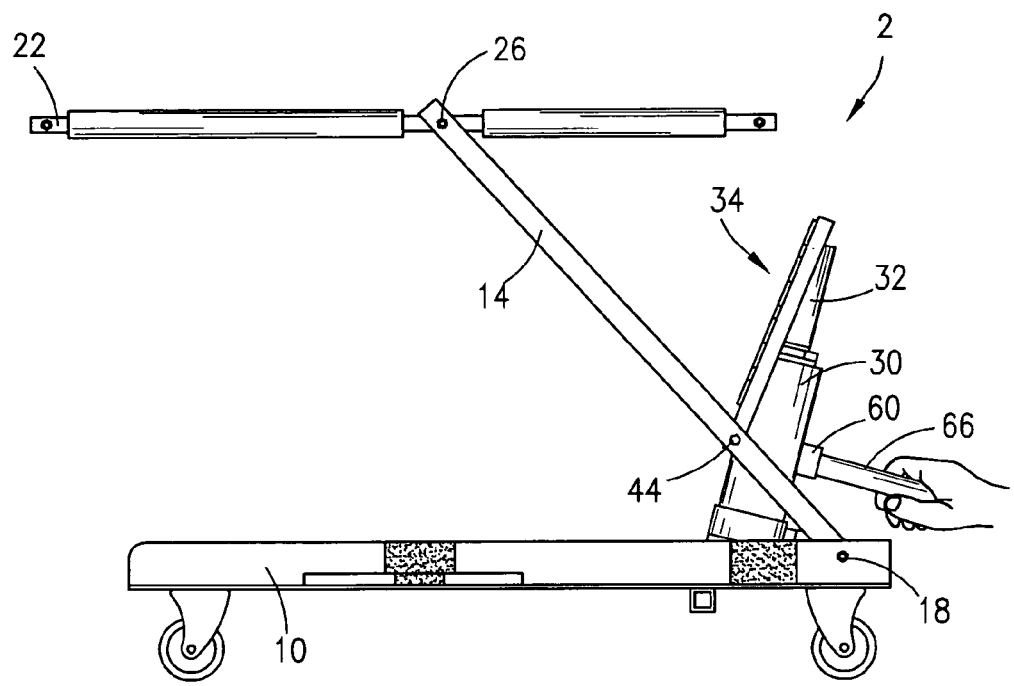
FIG. 5 is the side view of the apparatus seen in FIG. 4 in the extended position.

FIG. 5 depicts a side view of the apparatus 2 in the extended position. In other words, the operator has pumped the hydraulic jack cylinder 30 via the lever 66 so that the piston 32 has caused the U-shaped member 34 to raise which in turn causes the member 14 and member 12 (member 12 not shown in this view) to also raise. The member 14 and member 12 pivots at point 18 relative to the base frame (i.e. side 10). Also, member 14 and member 12 pivot at point 44 relative to the U-shaped member side 40. Lastly, the rod 22 and rod 20 (rod 20 not shown in this view) pivot at point 26 relative to the member 14 and the member 12. FIG. 5 also depicts how the design is balanced and level during lifting and lowering i.e. the rod 22 is essentially horizontal to the ground.

Figure 6:
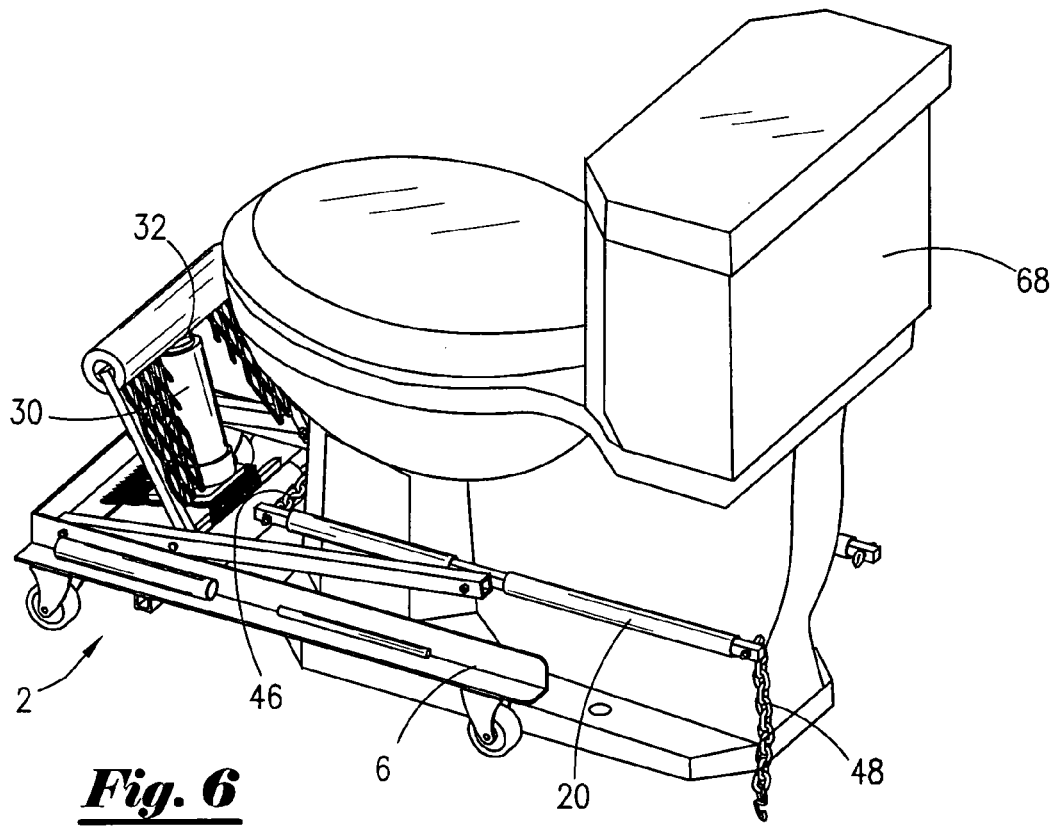
FIG. 6 is a perspective view of the apparatus seen in FIG. 1 straddling a toilet.

Referring now to FIG. 6, a perspective view of the apparatus 2 straddling a toilet 68 will now be described. The second railing 48 is seen unattached. In other words, the operator has advanced the apparatus 2 in order to straddle the toilet 68. Note the position of the rod 20 as well as the side 6. The first railing 46 is attached. After the operator places the apparatus 2 in the position seen in FIG. 6, then the operator can attach the railing 48.

Figure 7:
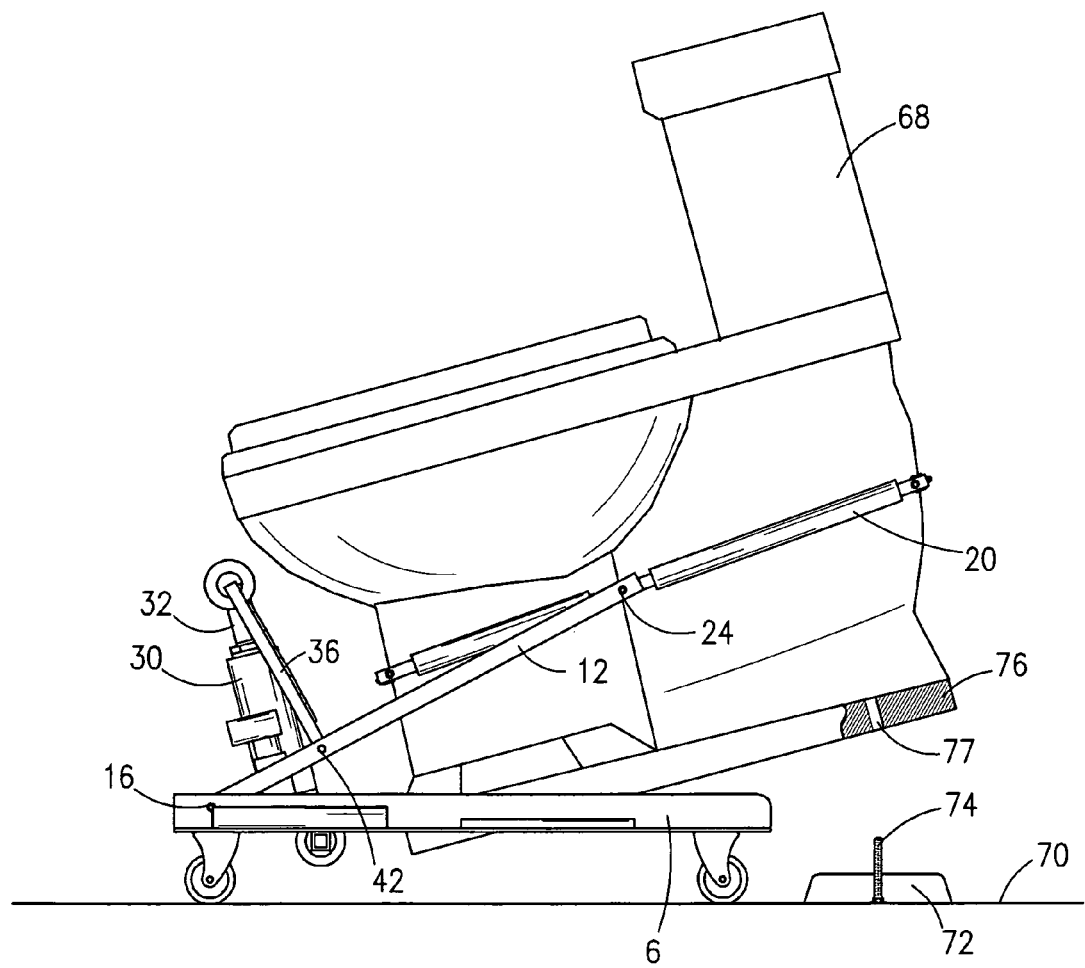
FIG. 7 is a side view of the apparatus seen in FIG. 1 having lifted a toilet.

FIG. 7 is a side view of the apparatus 2 having lifted the toilet 68. Hence, the operator would have pumped the jack cylinder 30, which lifts the piston 32, and in turn lifts the first member 12 and the second member 14 (member 14 not seen in this view). FIG. 7 also depicts the pivot point 16, pivot point 42 and pivot point 24. As those of ordinary skill in the art will appreciate, the toilet foundation 70 (also referred to as the closet bolt flange) has a wax seal 72 that surrounds the outlet tubular. Also, a plurality of bolts are protruding from the foundation 70.

FIG. 7 depicts the bolt 74 (only one (1) bolt shown). Hence, the toilet base flange 76 of the toilet 68 will have openings 77 that are configured to receive the bolts (i.e. bolt 74) for attaching the toilet 68 to the toilet foundation 70, as well understood by those of ordinary skill in the art. It should be noted that FIG. 7 represents the scenario that the toilet is being lifted from the toilet foundation 70, or alternatively, when the toilet is being aligned and lowered back about the wax seal 72 and onto the bolts.

Figure 8:
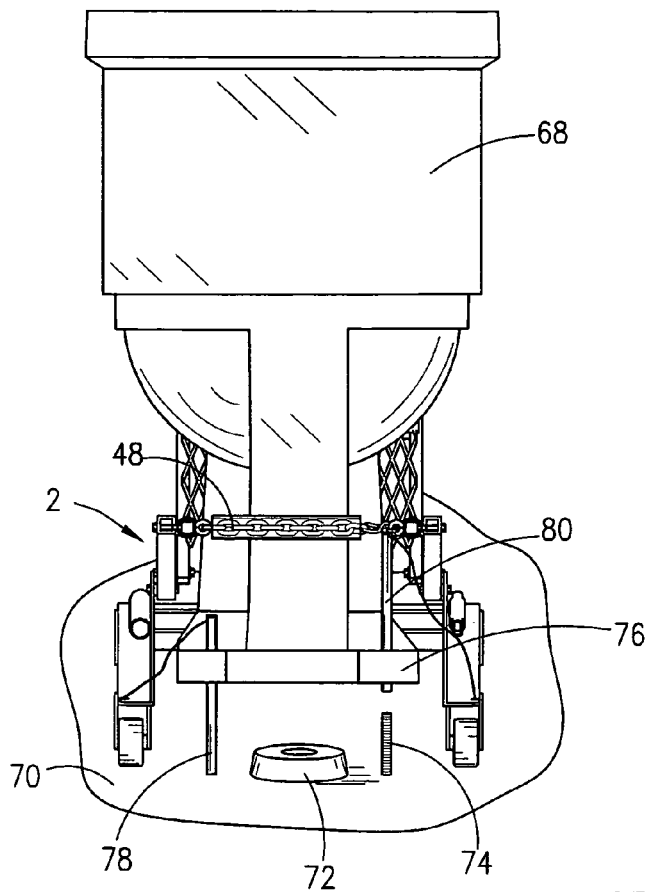
FIG. 8 illustrates the apparatus seen in FIG. 7 in the process of aligning and lowering the toilet back onto the toilet foundation.

FIG. 8 illustrates the apparatus 2 seen in FIG. 7 in the process of lowering the toilet back onto the toilet foundation 70 along with the alignment means. More specifically, the alignment means includes the alignment tubes 78, 80. Hence, the operator can place the tubes 78, 80 through the openings within the flange 76. The operator can then place the tubes 78, 80 on the respective bolts within the foundation 70. In this way, the operator can lower the toilet 68 along the tubes 78, 80 which will in turn align (i.e. guide) the openings in the flange pass the bolts.

Figure 9:
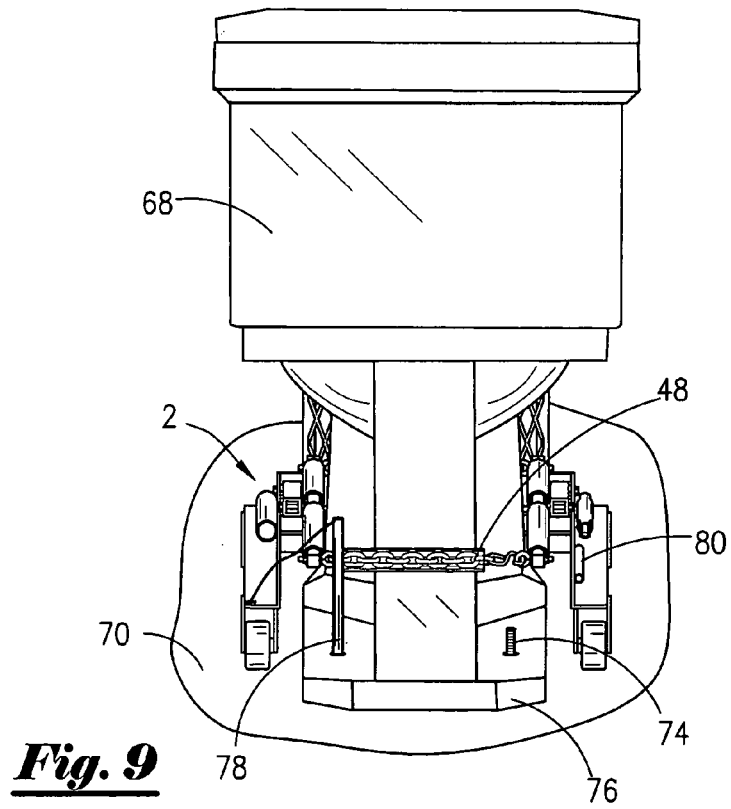
FIG. 9 illustrates the apparatus seen in FIG. 7 having been aligned and lowered onto the toilet foundation.

FIG. 9 illustrates the apparatus 2 seen in FIG. 7 having been aligned and lowered onto the bolts. As seen in FIG. 9, the bolt 74 is shown through the flange 76, and the tube 78 is still in place. Hence, the tubes 78, 80 are used in order to be placed through the openings in the flange 76, and onto the bolts, thereby allowing for alignment of the bolts relative to the openings in the flange 76. As those of ordinary skill will recognize, getting the bolts through the flange is always a difficult task due to several factors including the bulkiness of the toilet 68 and the inability to see the bolts for alignment.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. An apparatus for lifting a toilet, the apparatus comprising:
   a base frame having a first side, a second side and a third side;
   a lift frame pivotally attached at a first end to said base frame;
   a jack means, operatively attached to said lift frame, for selectively lifting and lowering said lift frame;
   an arm pivotally attached to said lift frame; and
   wherein said jack means comprises a jack cylinder; a piston concentrically disposed within said jack cylinder; and a U-shaped member, said U-shaped member attached at a first point to said piston, and wherein said U-shaped member is pivotally attached to said lift frame at a second point, so that as said piston extends from the jack cylinder, the lift frame is moved.

2. The apparatus of claim 1 wherein said arm contains a first rod and a second rod, and wherein the apparatus further comprises:
   a first railing attaching said first rod with said second rod in order to keep the first rod and the second rod together during lifting.

3. The apparatus of claim 2 wherein said lift frame contains a first member and a second member, and wherein the apparatus further comprises:
   a second railing attaching said first rod with said second rod in order to keep the first rod and the second rod together during lifting.

4. The apparatus of claim 3 wherein said base frame contains wheel means, mounted on an underside of said base frame, for transporting said base frame.

5. The apparatus of claim 4 further comprising a means for aligning the base frame, said means for aligning being capable of aligning a toilet base relative to a plurality of bolts extending from a floor flange of a toilet foundation.

6. The apparatus of claim 5 wherein the means for aligning comprises a first tube attached to the first side of the base frame and a second tube attached to the second side of the base frame.

7. The apparatus of claim 4 further comprising:
   a toilet positioned on said first and second rods, said toilet comprising a toilet base having a plurality of openings; and
   a means for aligning the base frame, said means for aligning being capable of aligning the openings of the toilet base relative to a plurality of bolts extending from a floor flange of a toilet foundation.

8. The apparatus of claim 7 wherein the means for aligning comprises a first tube attached to the first side of the base frame and a second tube attached to the second side of the base frame, said first tube and said second tube configured to fit through the openings of the toilet base.

9. The apparatus of claim 8 wherein said lift frame contains a first member and a second member, and the apparatus further comprises:
   a second railing attaching said first rod with said second rod in order to keep the first rod and the second rod together during lifting.

10. The apparatus of claim 9 wherein said base frame contains wheel means, mounted on an underside of said base frame, for transporting said base frame.

11. The apparatus of claim 10 wherein said jack device is a hydraulic device and said jack cylinder includes a hydraulic inlet and a hydraulic outlet.

12. An apparatus for lifting a toilet, the apparatus comprising:
- a base frame having a first side, a second side and a third side;
- a lift frame pivotally attached at a first end to said base frame;
- a jack device, operatively attached to said lift frame, for selectively lifting and lowering said lift frame;
- an arm pivotally attached to said lift frame, and wherein said arm includes a first rod and a second rod;
- a first railing attaching said first rod with said second rod in order to keep the first rod and the second rod together during lifting; and
- wherein said jack device comprises a jack cylinder; a piston concentrically disposed within said jack cylinder; a U-shaped member attached at a first point to said piston, and wherein said U-shaped member is pivotally attached to said lift frame at a second point so that as said piston extends, the lift frame is moved.

* * * * *